US006705771B2

(12) United States Patent
Jiang et al.

(10) Patent No.: US 6,705,771 B2
(45) Date of Patent: Mar. 16, 2004

(54) METHOD OF FUSION SPLICING SILICA FIBER WITH LOW-TEMPERATURE MULTI-COMPONENT GLASS FIBER

(75) Inventors: Shibin Jiang, Tucson, AZ (US); Jiafu Wang, Tucson, AZ (US)

(73) Assignee: NP Photonics, Inc., Tucson, AZ (US)

( * ) Notice: Subject to any disclaimer, the term of this patent is extended or adjusted under 35 U.S.C. 154(b) by 217 days.

(21) Appl. No.: 09/963,727

(22) Filed: Sep. 26, 2001

(65) Prior Publication Data

US 2003/0059179 A1 Mar. 27, 2003

(51) Int. Cl.$^7$ ................................................ G02B 6/255
(52) U.S. Cl. ........................ 385/96; 385/98; 219/121.13; 65/501
(58) Field of Search ................ 365/96, 98; 219/121.13; 65/501

(56) References Cited

U.S. PATENT DOCUMENTS

| 3,615,312 | A | | 10/1971 | Landry et al. ................... 65/4 |
|---|---|---|---|---|
| 4,008,344 | A | * | 2/1977 | Okamoto et al. ............ 428/374 |
| 5,251,062 | A | * | 10/1993 | Snitzer et al. ............ 359/341.1 |
| 5,560,760 | A | | 10/1996 | Toeppen ....................... 65/407 |
| 5,649,040 | A | | 7/1997 | Ljungqvist et al. ............ 385/95 |
| 6,244,757 | B1 | | 6/2001 | Kim et al. ..................... 385/96 |
| 6,289,027 | B1 | | 9/2001 | Lawrence et al. ............. 372/6 |
| 2002/0164132 | A1 | * | 11/2002 | Tian ............................. 385/98 |
| 2003/0081915 | A1 | * | 5/2003 | Fajardo et al. ................ 385/96 |

FOREIGN PATENT DOCUMENTS

| JP | 63105118 | A | * | 5/1988 | ............ D01F/11/04 |
|---|---|---|---|---|---|
| JP | 11287922 | A | * | 10/1999 | ............ G02B/6/255 |
| WO | WO 90/07134 | | | 6/1990 | ............ G02B/6/255 |

OTHER PUBLICATIONS

Adam E. Barnes et al., Sapphire Fibers: Optical Attenuation and Splicing Tecniques, Applied Optics, Oct. 20, 1995, Pgs. 6855 to 6858, vol. 34, No. 30.

Yutaka Kuroiwa et al., Fusion Spliceable and High Efficient Bi2O3–based EDF for Short–length and Broadband Application Pumped at 1480 nm., Pgs. Tu15–1 to Tu15–3, 2000 Optical Society of America.

Naoki Sugimoto et al., C+L Band Amplifying Properties in Short–length Bismuth Oxide Based Erbium Doped Fibers. Asahi Glass Company, Technical Bulletin Bismuth–based EDF, –A Broadband, High Efficiency and Compact EDF, Technical bulletin rev. 2.22, Feb. 23, 2000, Pgs. 1 to 17.

W. H. Loh et al., Single–sided Output Sn/Er/Yb Distributed Feedback Fiber Laser, Appl. Phys. Letter 69 (15), Oct. 7, 1996, Pgs. 2151 to 2153, 1996 American Institute of Physics.

(List continued on next page.)

Primary Examiner—Brian Healy
Assistant Examiner—Daniel Petkovsek
(74) Attorney, Agent, or Firm—Eric A. Gifford

(57) ABSTRACT

A low-cost approach provides a low loss and mechanically robust fusion splice between a standard silica fiber and a low-temperature multi-component glass fiber. An asymmetric heating configuration creates a temperature gradient between the silica and multi-component glass fibers that enhances diffusion, hence bond strength. The multi-component glass fiber may also be drawn with an outer cladding of a different multi-component glass. The outer cladding is selected so that it is thermally compatible with the multi-component glass used for the core and inner cladding and compatible with forming even stronger thermal diffusion bonds with the silica fiber.

50 Claims, 13 Drawing Sheets

OTHER PUBLICATIONS

H.Y. Tam, Simple Fusion Splicing Technique for Reducing Splicing Loss Between Standard Singlemode Fibres and Erbium–doped Fibre, Electronics Letters, Aug. 15, 1991, Pgs. 1597 to 1599, vol. 27, No. 17.

B. B. Harbison et al., Fusion Splicing of Heavy Metal Fluoride Glass Optical Fibres, Electronics Letters, 1989, vol. 25, No. 18.

L. Rivoallan et al., Fusiion Splicing of Fluoride Glass Optical Fibre with CO2 Laser, Electronics Letters, May 12, 1988.

Tetsuya Miyazaki et al., Nd–Doped Double–Clad Fiber Amplifier at 1.06 um, Journal of Lightwave Technology, Apr. 1998, Pgs. 562 to 566, vol. 16, No. 4, 1998.

Wenxin Zheng, Real Time Control of Arc Fusion for Optical Fiber Splicing, Journal of Lightwave Technology, Apr. 1993, Pgs. 548to 553, vol. 11, No. 4, 1993.

Wenxin Zheng et al., Erbium–Doped Fiber Splicing and Splice Loss Estimation, Journal of Lightwave Technology, Mar. 1994, Pgs. 430 to 435, vol. 12, No. 3, 1994.

K. Egashira et al., Optical Fiber Splicing with a Low–power CO2 Laser, Applied Optics, Jun. 1977, Pgs. 1636 to 1638, vol. 16, No. 6.

A. Berg et al., Arc Fusion Splices with Improved Strength (4.8 GPa) Approaching the Strength of the Fibre, Electronics Letters, Dec. 15, 1994, IEE 1995.

\* cited by examiner

METHOD OF FUSION SPLICING SILICA FIBER WITH LOW-TEMPERATURE MULTI-COMPONENT GLASS FIBER

BACKGROUND OF THE INVENTION

1. Field of the Invention

The present invention relates to the field of fiber optics, and more specifically, to the splicing of low-temperature multi-component glass fibers with silica glass fibers.

2. Description of the Related Art

In the field of fiber optics, joining or splicing of optical fibers is a well-known and widely practiced technique. The most common method for splicing of two standard fused silica fibers is based on the fusion of the adjacent ends of the optical fibers that are to be joined. The fibers are brought close to each other and are aligned so that their cores are coaxial with each other. Heat is transferred to both fiber ends by an electric arc or filament between two electrodes that are positioned on either sides of the axis of the two optical fibers. This heat is sufficient to soften the glass at the end of each of the two fibers to be joined. The optical fibers are then brought in contact and the hardening of the softened glass as the temperature is lowered below the softening and glass transition temperatures to form a permanent bond between the fibers. See, for instance, D. L. Bisbee, "Splicing Silica Fibers With an Electric Arc", Applied Optics, Vol. 15, No. 3, Mar. 1976, pp. 796–798. These techniques have been designed for and used to fuse fibers that have the same or very similar material compositions, e.g. two standard silica telecom fibers, in many applications including erbium doped fiber amplifiers (EDFAs).

In many applications, two fibers having different glass compositions and substantially different softening temperatures must be fusion spliced. Typically, a special fiber of some sort is being fusion spliced to a standard silica telecom fiber. The standard fusion splicing process must be modified to accommodate the difference in softening temperatures and provide a low loss (<0.2 dB) and mechanically reliable fusion splice.

A. Barnes et al., "Sapphire fibers: optical attenuation and splicing techniques," Vol. 34, No. 30 Applied Optics, Oct. 20, 1995 pp. 6855–6858 discloses a suitable method for splicing sapphire fiber to silica fiber. Silica fiber is a glass, isotropic, amorphous solid with a softening temperature of about 800–1000° C. as composed in Barnes' experiments. Sapphire, on the other hand, is a single anisotropic crystal with a melting temperature of over 2000° C. Initial tests fusing Sapphire directly to silica produced a strong splice but showed evidence of mullite crystal formation, which resulted in unacceptably high optical losses, 10 dB. To prevent mullite formation, the sapphire fiber was coated with silica by chemical vapor deposition (CVD) and fusion spliced as before. Although this prevented mullite formation, the optical losses were still high due to alignment issues. To improve fiber alignment, a capillary-tube splice technique was used.

Y. Kuroiwa et al., "Fusion Spliceable and High Efficiency $Bi_2O_3$-based EDF for Short-length and Broadband Application Pumped at 1480 nm," Optical Fiber Communication, Optical Society of America, February, 2001, discloses a method of fusion splicing a bismuth oxide ($Bi_2O_3$) based Er doped fiber (Bi-EDF) to a silica telecom fiber. The ends of the Bi-EDF and $SiO_2$ fibers are heated by arc discharge using a conventional fusion-splicing machine. The arc discharge time is precisely controlled to control the fusion condition of Bi-EDF, which has a softening temperature lower than the $SiO_2$ fiber. The two fiber ends are pushed toward one another to achieve fusion splicing.

The Asahi Glass Company (AGC) conducted and published an extensive study "Technical Bulleting: Bismuth-based EDF—A Broadband, High Efficiency and Compact EDF" on the effectiveness of different glasses to provide compact EDFAs and concluded that Bismuth based glass provided the best overall properties. A key factor in this determination was AGC's ability to form mechanically reliable low-loss fusion splices between Bismuth Oxide fibers and silica fibers and their inability to form such splices with Tellurite, Fluoride and Phosphate glasses, which have lower glass transition and softening temperatures then Bismuth based glass. AGC used an arc discharge at the gap between the fibers to form the fusion splice. However, Bismuth based glass does not provide the gain per unit length or other spectroscopic properties of Tellurite or Phosphate.

There remains an industry need for a method of fusion splicing low-temperature multi-component glasses such as Phosphate and Tellurite to standard silica fibers for use in compact EDFA and other telecom applications.

SUMMARY OF THE INVENTION

In view of the above problems, the present invention provides a low-cost approach for providing a low loss and mechanically robust fusion splice between a standard silica fiber and a low-temperature multi-component glass fiber such as phosphate, germanate or tellurite.

This is accomplished with an asymmetric configuration for fusion splicing the fibers. Instead of placing the heating element at the gap between the two fibers, the heating element is moved along the silica fiber a distance $d_o$ from the gap. This asymmetric configuration heats but does not soften the silica fiber and heats the multi-component glass fiber to above its softening temperature directly via the heating elements and indirectly via the silica fiber. Thus, the temperature at the end of the silica fiber $T_{si}$ is greater than the temperature at the end of the multi-component fiber $T_{mc}$. This temperature gradient serves to improve thermal diffusion between the two fibers when brought into contact thereby strengthening the fusion splice. Either electrode arc or resistive heaters can be used to fuse the fibers. In either case, the heat is preferably localized onto the silica fiber, which reduces the direct heating of the multi-component fiber, to maximize the temperature gradient and increase bond strength.

The addition of an outer cladding layer can be used to further strengthen the fusion splice of a phosphate or germanate glass fiber or to enable fusion splicing of other even lower temperature glass compositions such as tellurite. The multi-component glass fiber is drawn with an outer cladding that is chemically and thermally compatible with both the multi-component glass fiber and silica fiber (~100% $SiO_2$). More specifically, the material for the outer cladding will be a different multi-component glass having a softening temperature that is higher than that of the first multi-component glass but close enough so that the two materials can be drawn together in a fiber without any crystallization. The cladding material will also exhibit a glass network that is similar to that of silica fiber in order to form strong thermal diffusion bonding. For example, phosphate or germanate fibers may be drawn with a silicate outer cladding and a tellurite fiber may be drawn with a phosphate outer cladding. As a result, optical performance is dictated by the core and inner cladding layer of the first multi-component glass fiber while mechanical performance of the fusion splice is determined by the outer cladding. The ability to draw, rather than deposit, the outer cladding greatly simplifies the process, which lowers cost.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 7 is an exploded sectional view of the interface between the multi-component glass fiber and the silica fiber shown in FIG. 6a;

DETAILED DESCRIPTION OF THE INVENTION

Figure 2A:
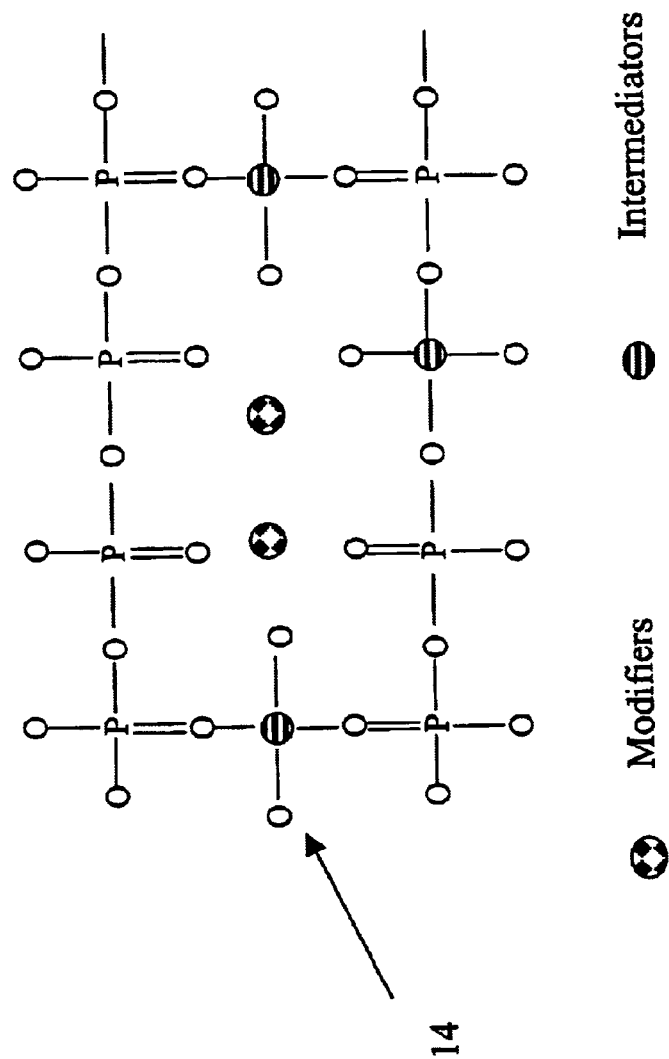
FIGS. 2a through 2c are diagrams of the glass networks for phosphate, germanate and tellurite, respectively.

The present invention provides a low-cost approach for providing a low loss and mechanically robust fusion splice between a standard silica fiber and a specialty low-temperature multi-component glass fiber. This type of fusion splice is particularly useful in and was motivated by the development of a compact EDFA. Conventional EDFAs manage 10 s of meters of silica fiber within a package, which must be large enough to accommodate this fiber management. To eliminate fiber management and reduce package size one must use a glass fiber that provides high gain per unit length. This in turn dictates a glass that has a high solubility of rare-earth dopants such as erbium and ytterbium and exhibits the necessary spectroscopic properties.

Low-Temperature Multi-Component Glasses

A subclass of multi-component glasses have a glass composition that contains one or more glass network formers selected from ($P_2O_5$ phosphate, $GeO_2$ germanate or $TeO_2$ tellurite) 30 to 80 weight percent, one or more glass network modifiers MO (alkaline-earth oxides and transition metal oxides such as BaO, CaO, MgO, Sro, ZnO, PbO and mixtures thereof) 2 to 40 weight percent and one or more glass network intermediators $L_2O_3$ ($Y_2O_3$, $La_2O_3$, $Al_2O_3$, $B_2O_3$ and mixtures thereof) 2 to 30 weight percent. The glass network formers are selected because their glass networks are characterized by a substantial amount of non-bridging oxygen that offers a great number of dopant sites for rare-earth ions. The modifier modifies the glass network, thereby reducing its melting temperature and creating additional dopant sites. The intermediator bridges some of the bonds in the network thereby increasing the network's strength and chemical durability without raising the melting temperature appreciably. The glass composition may be "alkaline-free" or may include additional network modifiers MO selected from alkaline metal oxides such as $K_2O$, $Na_2O$, $Li_2O$, and Rb2O. The fiber core is then doped with high concentrations of rare-earth dopants such as erbium or co-doped with, for example, ytterbium. The cladding layer (s) are typically undoped glass As a result, the subclass of multi-component glasses has a much lower softening temperature (<600° C.) than silica (>1200° C.), which greatly simplifies the fiber drawing process but complicates the process of fusion splicing to silica fiber. A quality fusion splice should exhibit low optical loss (<0.1 dB) and good tensile strength (>100 g). Conventional wisdom holds that these types of low-temperature multi-component glass fibers cannot be reliably fusion spliced to standard silica fibers, the difference in softening temperatures is too large and the glass networks are not compatible. However, the present invention provides a reliable fusion splice by using an asymmetric configuration for fusing the two fibers and, in some cases, drawing the multi-component glass fiber with a special outer cladding layer that is thermally compatible with the multi-component glass and yet compatible with forming strong thermal diffusion bonds with the silica fiber. The use of the special outer cladding layer may, in some cases, allow the use of a conventional symmetric fusion splice.

Figure 1:
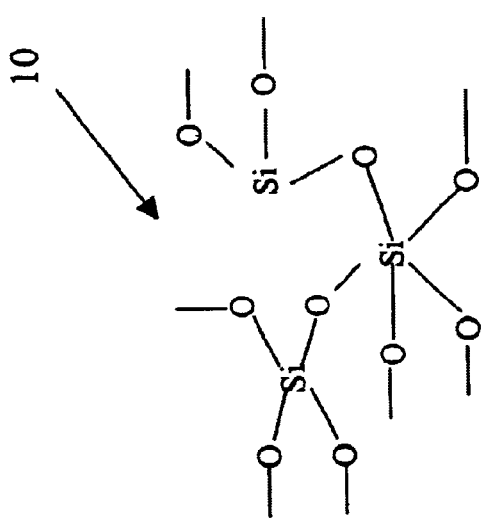
FIG. 1 is a diagram of the glass network for silica.

Turning now to the figures, as can be readily seen in FIG. 1, the silica glass 10 (~100% $SiO_2$) consists of $SiO_4$ tetrahedra joined to each other at corners. Oxygen acts as a bridge between neighboring tetrahedra. This bonding structure results in a high softening temperature (>1200° C.) with minimal dopant sites.

Figure 2B:
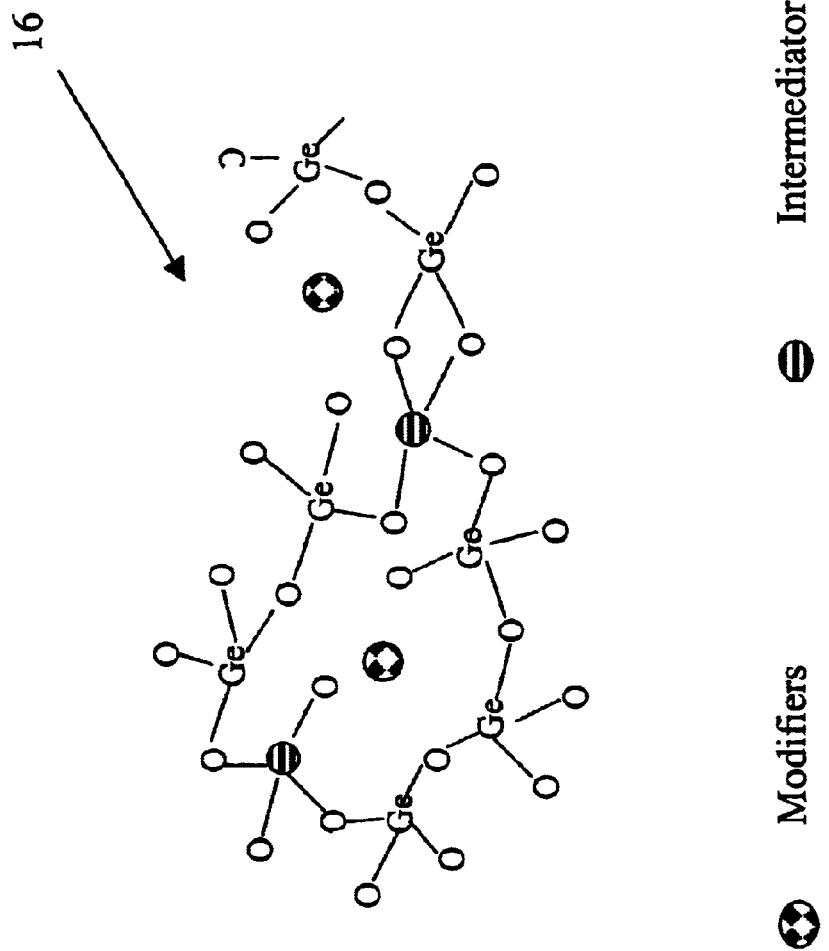
Figure 2C:
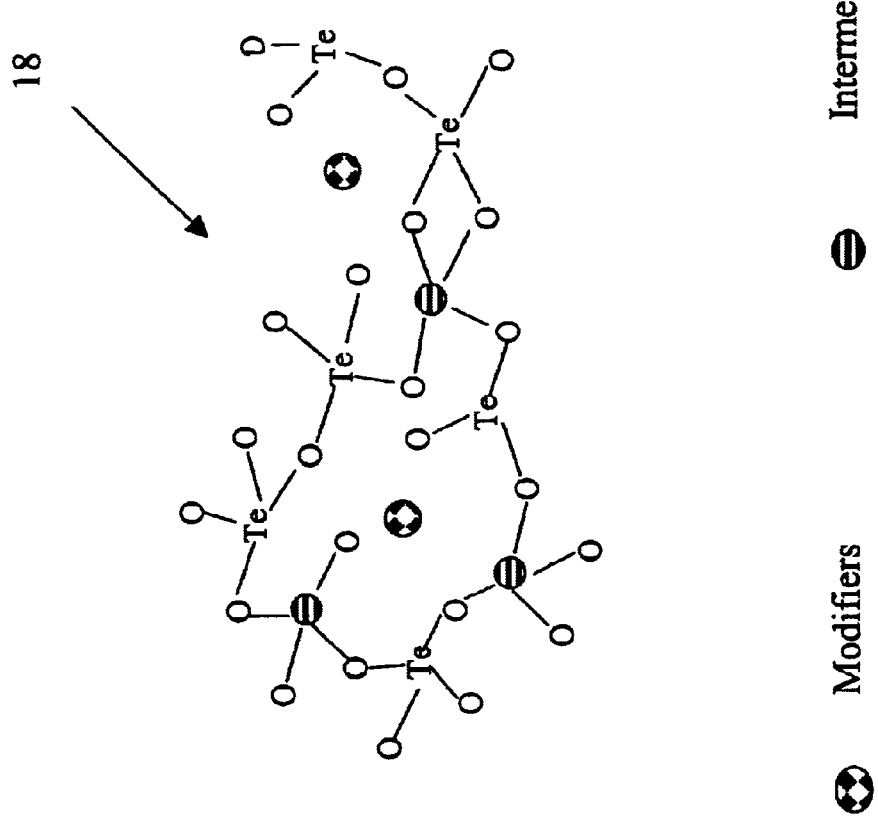

As shown in FIGS. 2a through 2c, the low temperature multi-component glasses phosphate, germanate and tellurite have a different bond structure. In phosphate glass 14 as shown in FIG. 2a, the basic unit of structure is the $PO_4$ tetrahedron. Because phosphate (P) is a pentavalent ion, one oxygen from each tetrahedron remains non-bridging to satisfy charge neutrality of the tetrahedron. Therefore, the connections of $PO_4$ tetrahedrons are made only at three corners. In this respect, phosphate glass differs from silica-based glasses. Due to the large amount of the non-bridging oxygen, the softening temperature of phosphate glasses is typically lower than silicate glasses. At the same time, the large amount of non-bridging oxygen in phosphate glass offers a great number of sites for rare-earth ions, which results in a high solubility of rare-earth ions. The modifier modifies the glass network, thereby reducing its melting temperature and creating even more sites for rare-earth ions. A uniform distribution of rare-earth ions in the glass is critical to obtain a high gain per unit length. The intermediator bridges some of the bonds in the network thereby increasing the network's strength and chemical durability without raising the melting temperature appreciably.

Phosphate fibers in the subclass of low temperature multi-component glasses have the following composition by weight percentages: a glass network former (phosphorus oxide $P_2O_5$) from 30 to 80 percent, a glass network modifier MO from 5 to 30 percent, and a glass network intermediator $L_2O_3$ from 5 to 30 percent, wherein MO is selected from the alkaline earth oxide group consisting of BaO, BeO, MgO, SrO, CaO, ZnO, PbO and mixtures thereof, and $L_2O_3$ is selected from $Al_2O_3$, $B_2O_3$, $Y_2O_3$, $La_2O_3$, and mixtures thereof. The glass composition may be "alkaline-free" or may include some amount of alkaline metal oxides such $K_2O$, $Na_2O$, $Li_2O$ and $Rb_2O$ that provide additional network modifiers. In the case of an active fiber, the core is doped with $Yb_2O_3$ up to 30 percent and more than zero percent and $Er_2O_3$ from 0.5 to 5 percent.

In germanate glass 16 as shown in FIG. 2*b*, the basic unit of structure is the $GeO_4$ tetrahedral. The coordination number of Ge changes from 4 to 6 when the addition of modifier increases. Due to the large size of Ge compared to Si, the bond strength of Ge—O is weaker than that of Si—O. So the melting temperature of germanate glasses typically is lower than silicate glasses. Germanate fibers in the subclass of low temperature multi-component glasses have the following composition by weight percentages: a glass network former (germanium oxide $GeO_2$) from 30 to 80 percent, a glass network modifier MO from 5 to 40 percent, and a glass network intermediator $L_2O_3$ from 5 to 30 percent, wherein MO is selected from the alkaline earth oxide group consisting of BaO, BeO, MgO, SrO, CaO, ZnO, PbO and mixtures thereof, and $L_2O_3$ is selected from $Al_2O_3$, $B_2O_3$, $Y_2O_3$, $La_2O_3$, and mixtures thereof. The glass composition may be "alkaline-free" or may include some amount of alkaline metal oxides such $K_2O$, $Na_2O$, $Li_2O$ and $Rb_2O$ that provide additional network modifiers. In the case of an active fiber, the core is doped with $Yb_2O_3$ up to 30 percent and more than zero percent and $Er_2O_3$ from 0.5 to 5 percent.

In tellurite glass 18 as shown in FIG. 2*c*, the basic unit of structure is the $TeO_4$ tetrahedral. $TeO_2$ is a conditional glass network former. $TeO_2$ will not form glass on its own, but will do so when melted with one or more suitable oxides, such as PbO, $WO_3$, ZnO, $Al_2O_3$, $B_2O_3$, $Y_2O_3$, and $La_2O_3$. $Te^{4+}$ ion may occur in three, four or six coordinated structure, which depends on the detailed glass composition and the site of ion.

Tellurite fibers in the subclass of low temperature multi-component glasses have the following composition by weight percentages: a glass network former (telluride oxide $TeO_2$) from 30 to 80 percent, a glass network modifier MO from 2 to 40 percent, and a glass network intermediator XO from 2 to 30 percent, wherein MO is selected from alkaline earth oxides and transition metal oxides consisting of BaO, BeO, MgO, SrO, CaO, ZnO, PbO and mixtures thereof, and XO is selected from PbO, ZnO, $WO_3$, $Al_2O_3$, $B_2O_3$, $Y_2O_3$, $La_2O_3$, and mixtures thereof. The glass composition may be "alkaline-free" or may include some amount of alkaline metal oxides such $K_2O$, $Na_2O$, $Li_2O$ and $Rb_2O$ that provide additional network modifiers. In the case of an active fiber, the core is doped with $Yb_2O_3$ up to 30 percent and more than zero percent and $Er_2O_3$ from 0.5 to 5 percent.

Asymmetric Fusion Splicing

Figure 3:
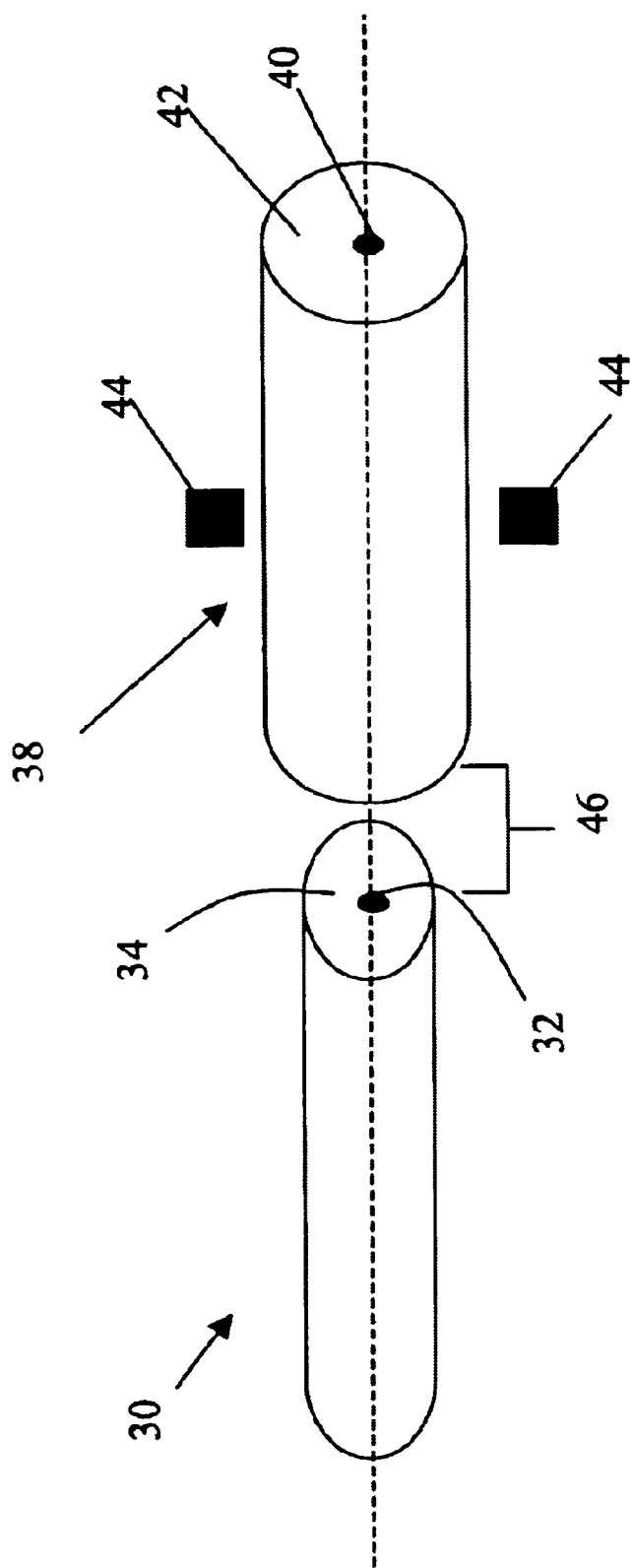
FIG. 3 is an embodiment for asymmetrically fusion splicing a multi-component glass fiber to a silica fiber in accordance with the present invention.

FIG. 3 illustrates the asymmetric fusion splicing process in accordance with the present invention in which a specialty multi-component glass fiber 30, depicted here as a single-clad fiber having a core 32 and an inner cladding 34, is aligned and brought close to a silica telecom fiber 38 having a core 40 and a cladding 42. A heating element 44 is positioned on either side of or partially encircling the silica fiber 38 at a distance $d_o$ from gap 46. The heating element softens the glass at the end of specialty fiber 30 but not the silica telecom fiber 38. Critically, the temperature of the silica fiber 38 is raised to a temperature above the glass transition temperature of the multi-component glass fiber 30 yet below that of silica. The optical fibers are then brought in contact. The softened glass hardens as the temperature is lowered below the softening and glass transition temperatures of the specialty fiber to form a permanent thermally diffused bond between the fibers.

Attempts to fusion splice the fibers when the heating element 44 was placed at the gap 46 between the two fibers led to unsatisfactory results either due to excessive optical loss or inadequate mechanical strength. When the heating element was placed near the multi-component glass fiber, the temperature required to bring the multi-component glass above its softening temperature but below its melting temperature, did not bring the silica fiber to a temperature that is high enough to ensure a good bond. Placing the heater over the silica fiber and moving it away from the gap between the fibers by a distance $d_o$ can increase the temperature of the heater increased without melting the multi-component glass fiber directly. The silica fiber 38 is brought to a higher temperature and its end 48 acts as the heating element for the phosphate fiber 30 that is initially placed at a distance L from the end of the silica fiber and then brought into contact with the silica fiber when it is fusion spliced. Since the silica fiber is at a higher temperature, the diffusion processes and chemical reaction procedures that form the thermal diffusion bonds between the two fibers are more efficient leading to a bond with good tensile strength. Furthermore, it is believed that the use of the silica fiber to indirectly heat the multi-component glass fiber provides a more uniform heating, hence softening of the end 50 of fiber 30 thereby improving bond strength.

Figure 4:
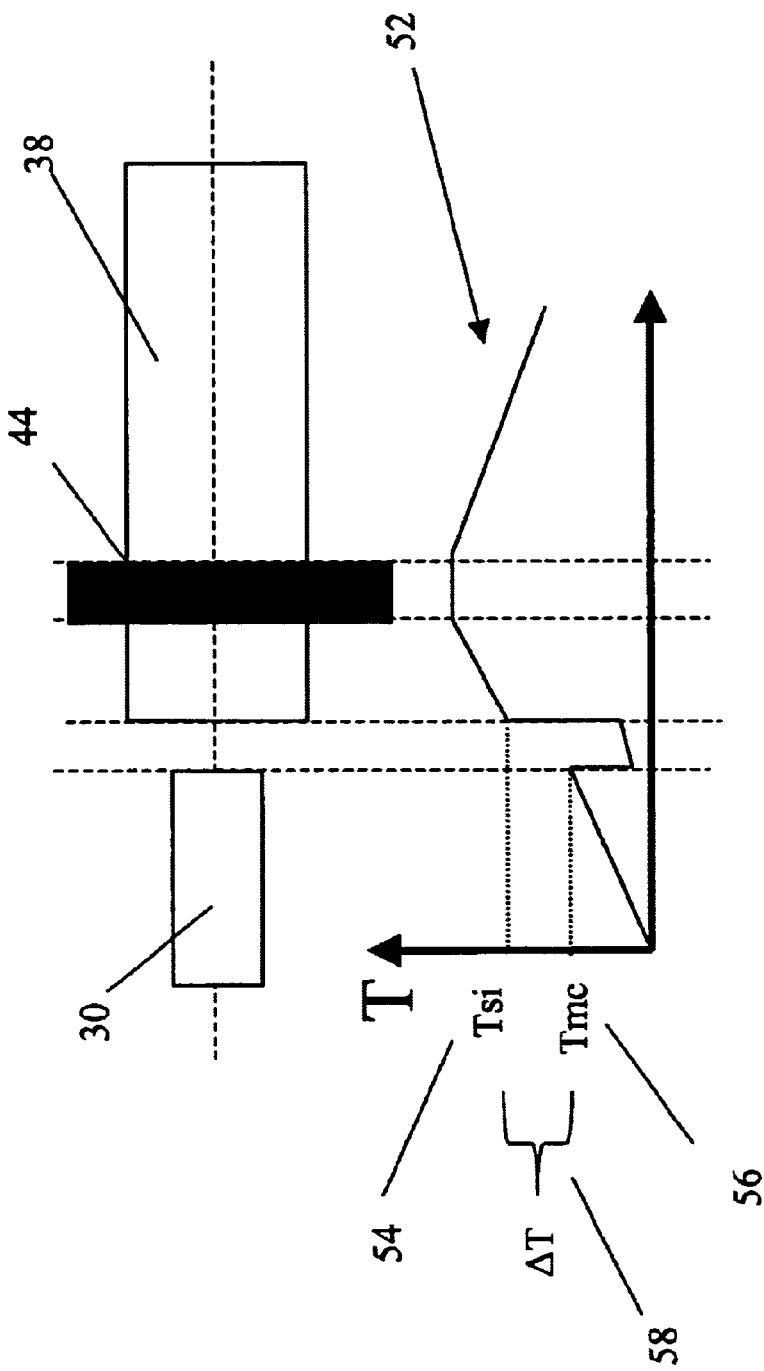
FIG. 4 is a plot of a representative temperature profile for the asymmetric geometry shown in FIG. 3.

FIG. 4 depicts a representative temperature profile 52 for the asymmetric configuration shown in FIG. 3. As shown the temperature is a maximum on the silica fiber 38 at the position of the heating element 44 and gradually decreases to a temperature 54 ($T_{si}$) at the end 48 of the silica fiber. On the other side of the air gap 46, the temperature 56 ($T_{mc}$) at the end 50 of the fiber 30 is lower such that the temperature gradient 58, $\Delta T = T_{si} - T_{mc} > 0$. By asymmetrically heating the fibers, the end of the silica fiber can be raised to a temperature that is higher than that at the end of the multi-component glass fiber. The resulting temperature gradient between the two fibers is essential to get low loss and high tensile strength simultaneously.

Figure 5A:
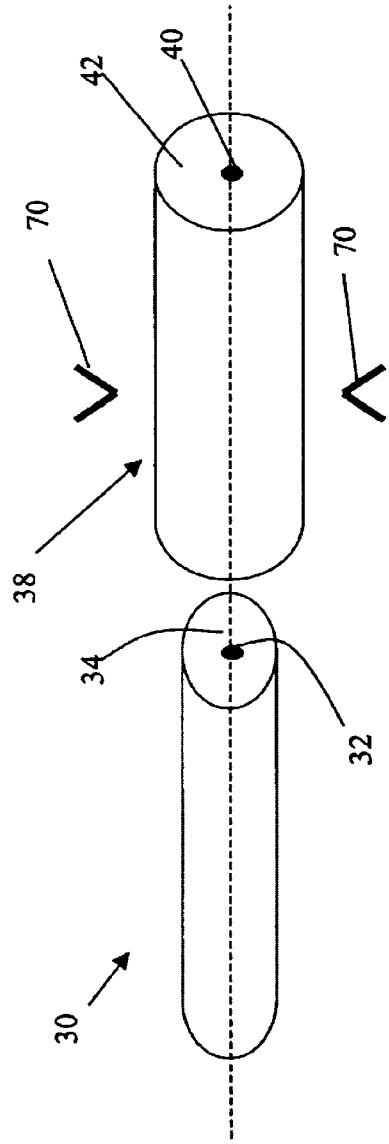
FIGS. 5a and 5b are schematic illustrations of electrode arc and resistive heater fusion splicers.

Asymmetric heating of the fiber has been achieved in two different ways. As shown in FIG. 5*a*, an Ericsson FSU 995 FA fusion splicer was used to heat the fibers through an electric discharge induced between two electrodes 70 positioned on either side of the silica fiber 38. The Ericsson fusion splicer imposes a distance between the two electrodes on the order of 3 mm, which is quite large compared with the diameter of the fibers, and thus does not provide selective or localized heating of the silica fiber. As a result, the arc directly heats the multi-component glass as well as the silica fiber. This limits the value of the current that can be applied to the electrodes and the temperature of the arc to avoid melting the multi-component glass fiber. This in turn reduces the temperature 54 ($T_{si}$) to which the silica fiber can be raised and reduces the temperature gradient 58 ($\Delta T$) between the fibers thereby limiting the bond strength of the splice. Ericsson's Fusion Splicer could be redesigned to move the electrodes closer together thereby localizing the heat on the silica fiber.

A number of tests were run using the Ericsson Fusion Splicer. The parameters for the splicing program (P21) were:

prefusion time, 0.1 s; prefuse current, 5.4 mA; gap, 50 um; overlap, 6 um; fusion time 1, 0.2 s; fusion current 1, 4.5 mA; fusion time 2, 0 s; fusion current 2, 0 mA; fusion time 3, 0 s; fusion current 3, 0 mA; left MFD 9.8 um, right MFD 9.8 um; set center, 150; AOA current, 0 mA; early prefusion, NO; align accuracy, 0.15 um; loss shift, 0 dB; auto arc center, NO. Four samples were prepared with Fiber (K31 a+Tube 13+Tube #2), which has 5 um core and 90 um outside diameter with 3% Er and 2% $Yb_2O_3$. The losses for four samples of 4 cm long phosphate gain fiber are approximately 0.3, 0.5, 0.5 and 0.4 dB, respectively, per fusion splice. The mechanical strength for these splices was about 10 grams.

Figure 5B:
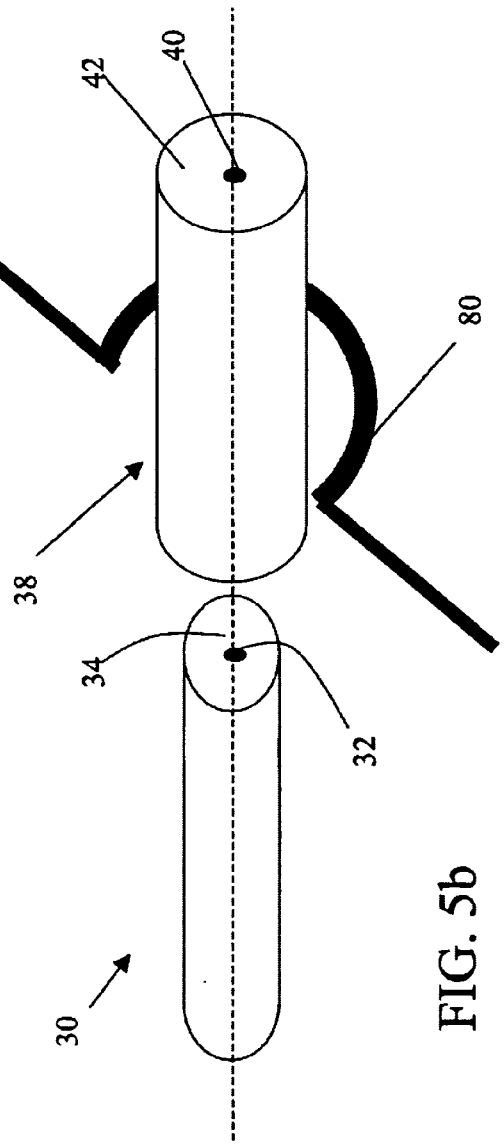

As shown in FIG. 5b, a Filament Fusion Splicing System, Model FFS-2000, Vytran Corporation places a thin filament 80 with a semi-circle profile around the silica fiber 38. In this geometry, the heating element is in much closer proximity to the silica fiber and heating of the fiber is efficient. The temperature 54 ($T_{si}$) of the silica fiber can be higher and the temperature gradient 58 ($\Delta T$) between the fibers larger without melting the multi-component glass. Splices performed in this geometry provided higher tensile strength than those done with the Ericsson Fusion Splicer due to the localized heating capability.

A number of tests were run using the Vytran Fusion Splicer. The parameters for the splicing were: view to splicing distance, 1680 steps; pre-gap, 5.0 um, pre-push 2 um, Hot-push 8 um; Push Velocity, 280 step/second; Hot push delay, 0.16 seconds, on-Duration, 0.3 seconds, and power, 15.0 W. The loss for ten samples of 9 cm phosphate gain fiber E (PZn2Er2Yb15+clad 20-3+clad 20-3, core 6 um and outside diameter 102 um) spliced with 20 cm SMF 28 fiber and 1 cm double clad silica fiber were: 0.9, 1.3, 0.4, 1.2, 0.3, 1.1, 0.9, 0.45, 0.35, 1.45, 0.05 dB, respectively. The fusion splice loss will be reduced to <0.2 dB with further optimization, and the reproducibility will be improved. The mechanical strength is enhanced considerably compared to the samples prepared with the Ericsson fusion splicer, usually higher than 100 grams pull strength.

Multiple splicing experiments performed under different conditions have shown that in addition to the localization of heat onto the silica fiber, the quality of the splice was strongly dependent on the following parameters:

$d_0$: distance from the heater to the end facet of the standard silica fiber;

T(w): temperature of the heater, which is function of power (w) supplied; and $\tau$: duration of the heating.

For a given fiber, there exist one or several sets of parameters $\{d_0, T, \tau\}$ that lead to low loss and high tensile strength. One might think that when increasing the distance $d_0$, an increase of the temperature T will lead to similar results. Indeed, experience shows that the number of sets of parameters that lead simultaneously to low loss and high tensile strength is limited. The following trends have been observed:

when increasing $d_0$ and T over their optimum values, tensile strength is high but optical loss is also high.

when decreasing the temperature T and increasing the duration of heating $\tau$ optical loss can be kept low but the tensile strength is poor when increasing $d_0$, keeping T constant, and increasing $\tau$ leads to high loss due to the darkening of the silica glass.

For a particular phosphate glass fiber with 102 microns diameter, the following set of parameters using the Vytran fusion splicer was found to produce a high quality splice:

$d_0$=520 $\mu$m

T: not known but power delivered to the heating element is 15 W.(*)

$\tau$=0.3 s (if $\tau$>0.3 s optical loss goes up)

(*) the power required to melt the phosphate fiber is 3.8 W. This shows that if the heater is placed on either side of the phosphate fiber, the maximum power allowable to prevent the low temperature fiber from melting and losing its mechanical properties is much smaller than the power used to heat the silica fiber (15 W).

The power (temperature) of the heater has an upper value of 18 W. Above this value the silica fiber starts to melt and loses its mechanical properties. The fiber bends under gravity and the end of the fiber goes out of alignment with the phosphate fiber and results in high optical loss.

In general, the parameters assume values in the following approximate ranges: $d_0$ ranges from 10 to 1500 microns, T(w) is around 7 w to 18 w and $\tau$ is around 0.1 to 10 s. Outside the defined parameter space for a given glass composition and fiber diameter, tensile strength is lost in some cases, or optical loss in others. A good splice requires simultaneously low loss and high tensile strength.

Figure 6A:
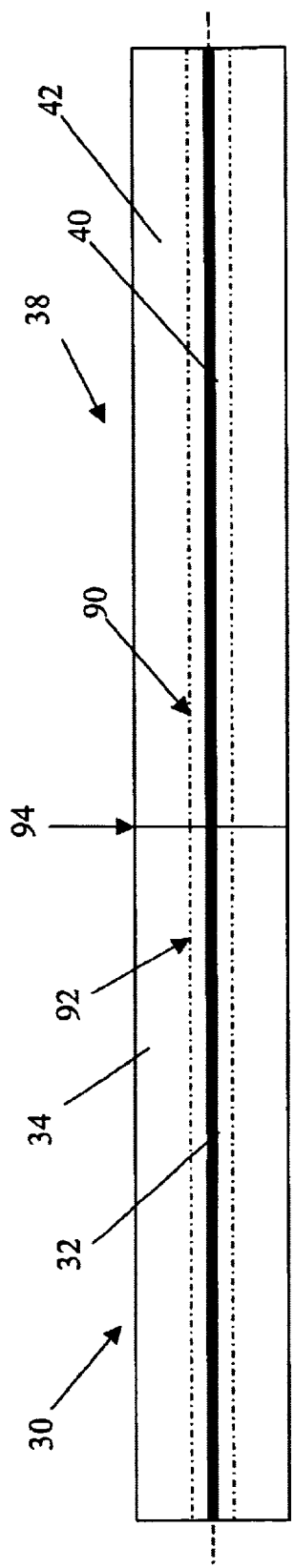
FIGS. 6a and 6b are sectional views of the fusion splice for two different multi-component glass fibers.

FIG. 6a illustrates the fusion-spliced multi-component fiber 30 and silica telecom fiber 38. In this particular fiber, the core and cladding diameters of the two fibers are matched. The mode-field 90 in the silica fiber extends significantly outside the core 40. The fiber's numerical aperture and core diameter are preferably adjusted to match the fiber's mode field 92 to the silica fiber to minimize optical losses at the fusion splice 94. For example, a NA=0.135 and core diameter of 8.4 microns was tested.

Figure 6B:
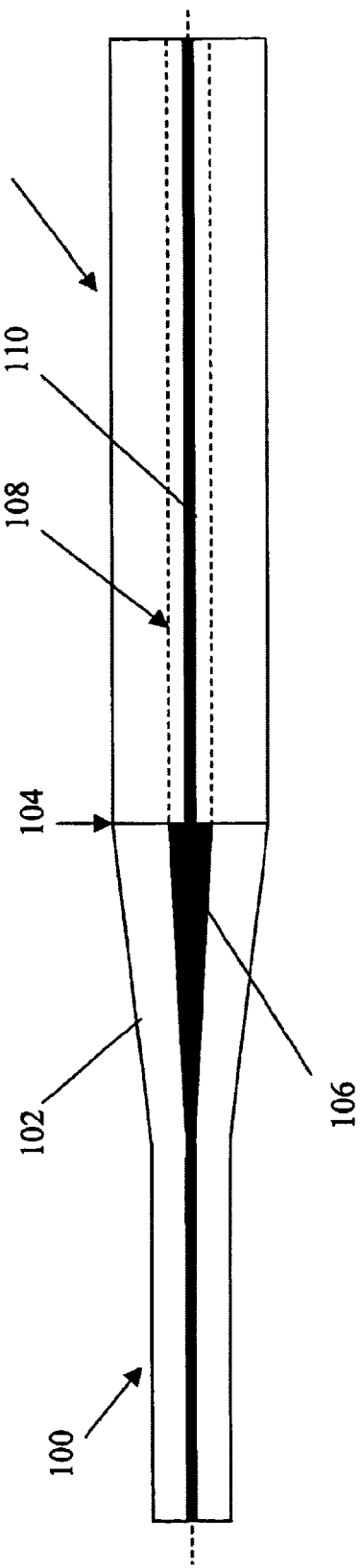

FIG. 6b illustrates the fusion-splice of a different multi-component glass fiber 100 with a telecom fiber 101. In this particular embodiment, the outer diameter of the specialty fiber (90 microns) is smaller than the outer diameter of the telecom fiber (125 microns). When the fibers are fusion spliced, the specialty fiber exhibits a taper 102 or flare so that its outer diameter approximately matches the telecom fiber at the fusion splice 104. As a result, the fiber's core 106 tapers so that it is wider at the fusion-splice. The mode-field 108 in the silica fiber extends significantly outside the core 110. The multi-component fiber is designed so that its mode field 112 (NA=0.17, Core diameter of 6 microns) is substantially coextensive with its core 106. Therefore, the taper of core 106 has the desirable effect of closely matching the specialty fiber's mode field 112 to the silica fiber's mode-field 108.

Figure 7:
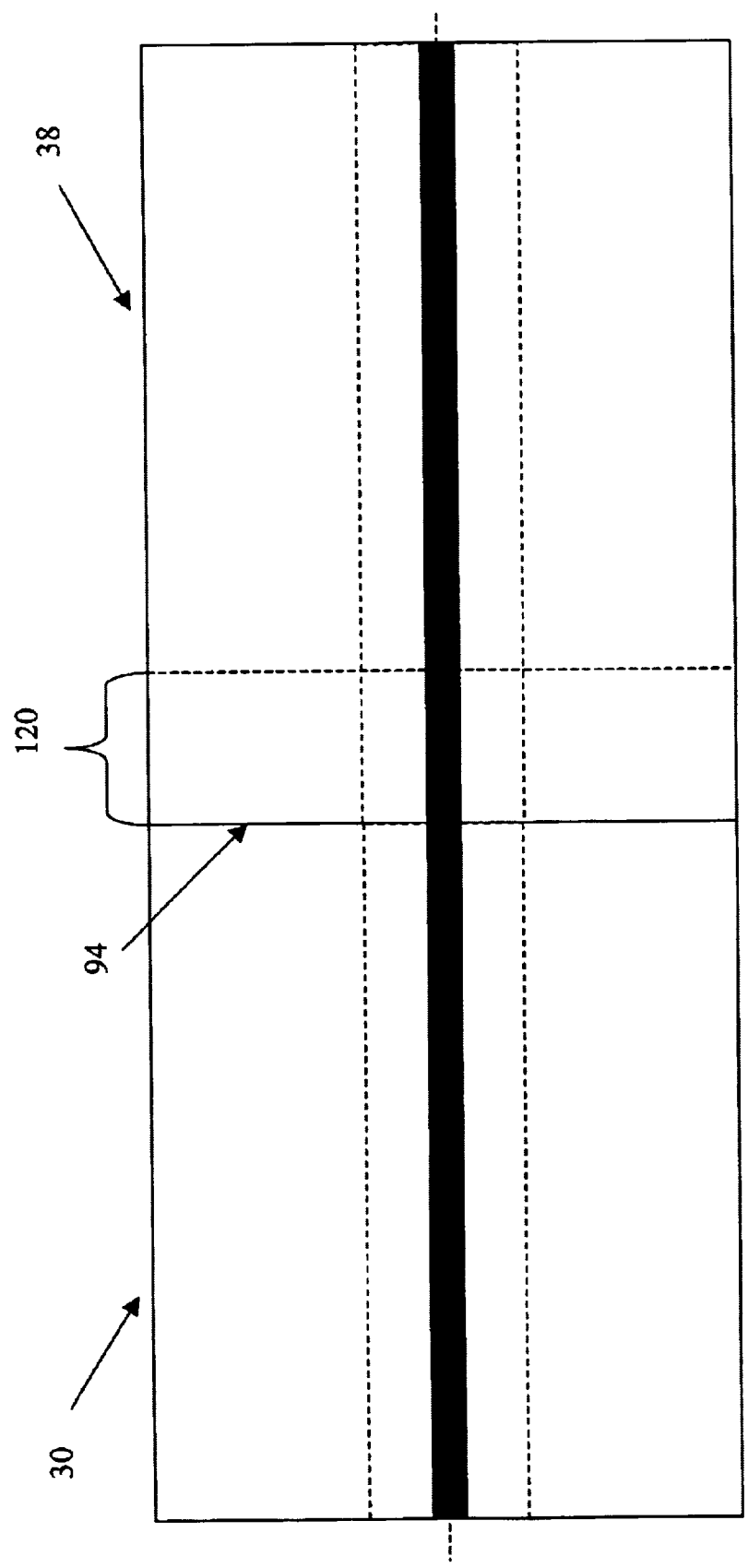

FIG. 7 depicts an enlarged view of the fusion-splice 94 shown in FIG. 6a. The fusion splicing process causes a number of modifier and intermediator ions in the multi-component glass fiber to diffuse across the fusion-splice 94 into the silica glass in a transition region 120. Although the multi-component glasses do not crystallize above a given temperature, the hybrid Si-x glass where x is a mixture of modifier and intermediator ions in the transition region 120 does exhibit a transition temperature $T_x$. Crystallization turns the glass opaque, which makes optical losses unacceptably high. Therefore $T_x$ establishes another upper bound on the fusion temperature, specifically $T_{si}$.

Thus, the heating and temperature profiles are constrained as follows:

$$T_{mc\text{-}soft} < T_{mc} < T_{si} < \min(T_{mc\text{-}melt}, T_{si\text{-}trans}, T_x)$$

where $T_{mc\text{-}soft}$ is the softening temperature of the multi-component glass, $T_{mc}$ is the temperature at the end of the multi-component glass fiber, $T_{si}$ is the temperature at the end of the silica fiber $T_{mc-melt}$ is the melting temperature of the multi-component glass, $T_{si-trans}$ is the glass transition temperature of silica and $T_x$ is the crystallization temperature of Si-x in the transition region at the fusion splice. As a point of reference, as the temperature of most glass material is raised the glass undergoes a number of transitions. First, at the glass transition temperature the molecules begin to have limited ability to move. Second, the glass becomes viscous at a softening temperature typically 10–20° C. higher than the glass transition temperature. Next, certain glasses (not multi-component glasses) crystallize at a crystallization temperature, which is another 40–80° C. higher. Finally, the glasses will reach a point where they no longer can maintain structure and melt, i.e. the melting temperature.

Fiber Drawing with an Outer Cladding

The addition of an outer cladding can be used to further strengthen the fusion splice of a phosphate or germanate glass fiber or to enable fusion splicing of other even lower temperature glass compositions such as tellurite. The multi-component glass fiber is drawn with an outer cladding that is chemically and thermally compatible with both the multi-component glass fiber and silica fiber. More specifically, the material for the outer cladding will be a different multi-component glass have a softening temperature that is higher than that of the core and inner cladding multi-component glass but close enough that the two materials can be drawn together in a fiber. The outer cladding material will also exhibit a glass network that is similar to that of silica in order to form strong thermal diffusion bonds. The fibers are heated using the asymmetric configuration just described or, possibly, a conventional symmetric configuration, to above the softening temperatures of the multi-component glasses but below the softening temperature of silica and then brought together to form the splice. The higher softening temperature of the outer cladding may make conventional fusion splicing in some cases. As a result, optical performance is dictated by the core and inner cladding while mechanical performance is determined by the outer cladding. The ability to draw, rather than deposit, the outer cladding greatly simplifies the process, which lowers cost.

Figure 8B:
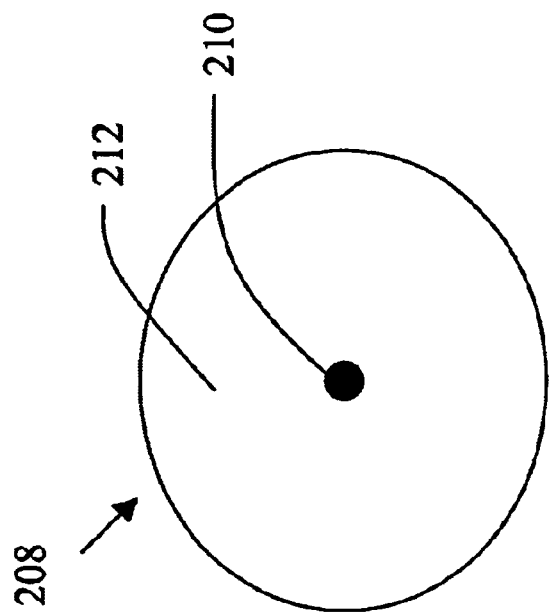
FIGS. 8a and 8b show cross-sections of multi-component glass fibers drawn with an outer cladding.
Figure 8A:
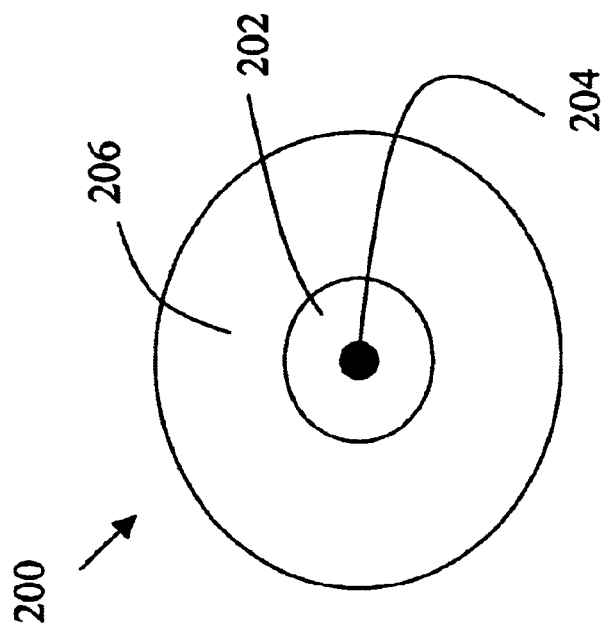

In one embodiment, the specialty multi-component glass fiber 200 shown in FIG. 8*a* includes an inner cladding 202 around a core 204 formed from the same multi-component glass host material and an outer cladding 206 formed around the inner cladding 202 of a thermally compatible yet higher softening temperature material whose network is more similar to that of silica. The outer cladding may or may not function to confine light inside the inner cladding; i.e. the refractive index of the outer cladding $n_{oc}$ may be greater than or less than the refractive index of the inner cladding $n_{ic}$. The cross-sectional area of the outer cladding is preferably at least 50% of the fiber's cross-sectional area. For example, the diameters of the core, inner cladding and outer cladding are suitably about 4–10 microns, 15–70 microns and 60–125 microns, respectively. As a result, the optical properties are dictated by the first multi-component glass in the core and inner cladding and the mechanical properties of the fusion splice are dominated by the thermal diffusion bonds between silica and the second multi-component glass.

Figure 9:
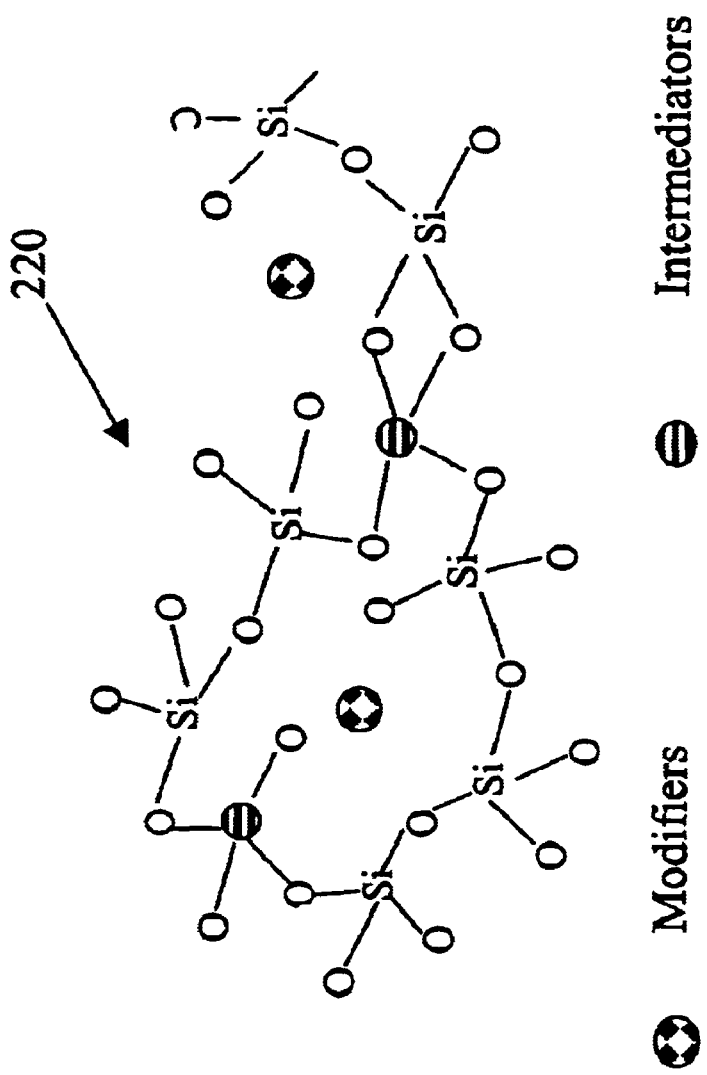
FIG. 9 is a diagram of the glass network for silicate.

Specific examples include, the phosphate or germanate glass fibers described above, which have similar softening temperatures <600° C., drawn together with a silicate (30%–80% $SiO_2$) outer cladding, which exhibits a softening temperature range from 400 to 900° C. As illustrated in FIG. 9 below silicate has a similar glass network to pure silica but a softening temperature much closer to the other multi-component glasses. In this example, the inner cladding also acts as a barrier to prevent diffusion of hydroxide ($OH^-$) ions from the outer cladding into the core. Silicate glasses suitable for the outer cladding comprise a glass network of silicon oxide ($SiO_2$) from 30 to 80 percent, a glass network modifier MO from 5 to 40 percent, and a glass network intermediator $L_2O_3$ from 5 to 30 percent, MO is selected from alkaline earth oxides and transition metal oxides consisting of BaO, BeO, MgO, SrO, CaO, ZnO, PbO and mixtures thereof, and $L_2O_3$ is selected from $Al_2O_3$, $B_2O_3$, $Y_2O_3$, $La_2O_3$, and mixtures thereof.

In another example, tellurite glass, which has a much lower softening temperature<400° C., is drawn with a tellurite core (doped or undoped), an undoped tellurite inner cladding and a phosphate or germanate outer cladding. The ability to make a direct phosphate-to-silica or germanate-to-silica fusion splice was an encouraging result that enables tellurite to be fusion spliced to silica. A direct tellurite-to-silica splice would otherwise be impossible because of tellurite's much lower softening temperature. The phosphate-to-silica or germanate-to-silica splice is not as strong as the silica-to-silica splice and may require additional mechanical support. The tellurite glass comprises the following composition by weight percentages (telluride oxide $TeO_2$) from 30 to 80 percent, a glass network modifier MO from 2 to 40 percent, and a glass network intermediator XO from 2 to 30 percent, wherein MO is selected from the alkaline earth oxide group consisting of BaO, BeO, MgO, SrO, CaO, ZnO, PbO and mixtures thereof, and XO is selected from PbO, ZnO, $WO_3$, $Al_2O_3$, $B_2O_3$, $Y_2O_3$, $La_2O_3$, and mixtures thereof.

In another embodiment shown in FIG. 8*b*, the specialty multi-component glass fiber 208 is drawn without the inner cladding such that the core 210 is formed from one type of multi-component glass and the outer cladding 212 is formed from a thermally compatible yet higher softening temperature material whose network is more similar to that of silica. In this embodiment, the cladding material must be carefully selected and special steps must be taken during fabrication to minimize any diffusion of $OH^-$ ions from the cladding into the core.

In either case, the outer cladding must be chemically and thermally compatible with both the multi-component glass fiber and silica fiber to form low loss and strong thermally diffused bonds with silica. Based on principle "similar dissolve similar", silica has a very high solubility of silicate so that they can form a strong bond on interface. As discussed previously in FIG. 1, silica glass consists of $SiO_4$ tetrahedra joined to each other at corners. Each oxygen acts as a bridge between neighboring tetrahedra. This bonding structure results in a high softening temperature. When glass network modifiers and intermediators are added into the silica, the so-called silicate glass 220 is formed as shown in FIG. 9. The positive charge of network modifiers is satisfied by an ionic bond to an oxygen. This is accomplished by breaking a bridge and attaching an oxygen to the broken bridge. The intermediators sometimes can bridge the broken network together. Overall the structure of silicate glass exhibits a reduced connectivity compared to silica glass, and hence, the structure has more freedom to move and expand. Therefore, the softening temperature is lower compared to silica glass.

Figure 10:
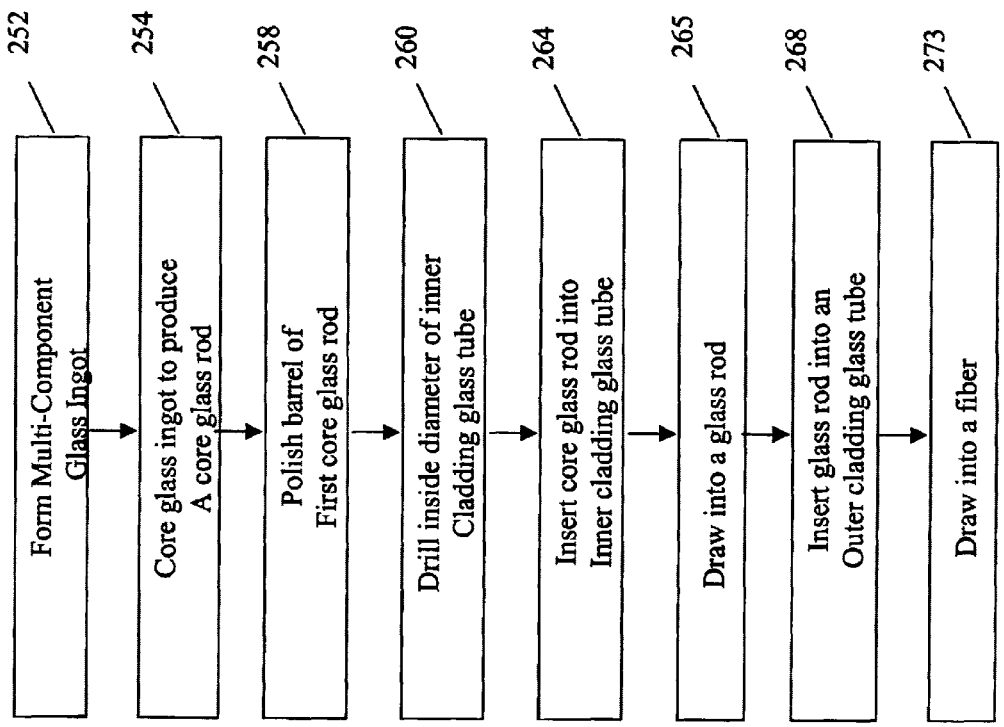
FIG. 10 is a flowchart showing the steps of manufacturing a multi-component glass preform and fiber for the fiber shown in FIG. 8a in accordance with the present invention.
Figure 11:
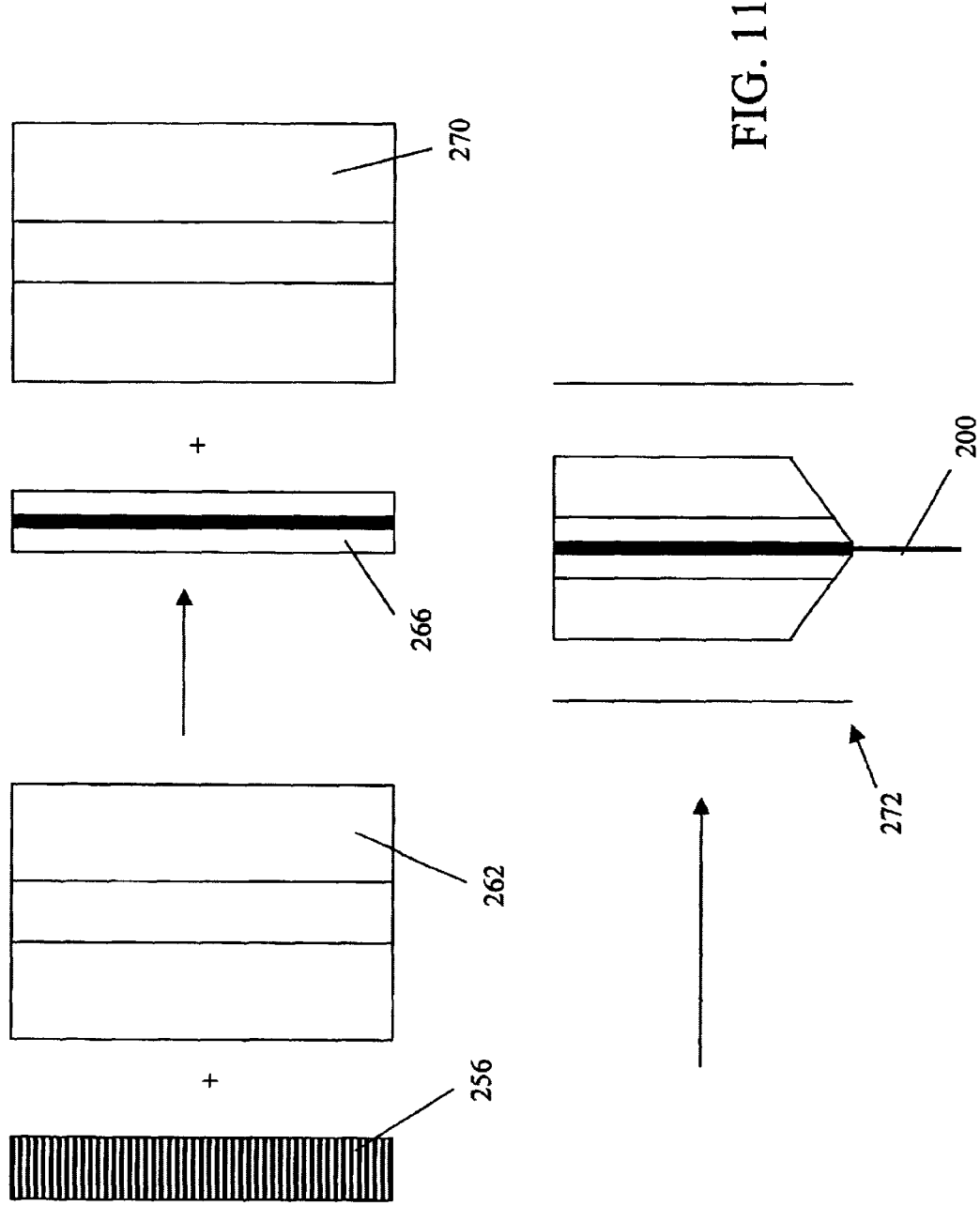
FIG. 11 is a diagram showing schematically the stages of manufacture for producing the multi-component glass fiber shown in FIG. 8a in accordance with the present invention.

FIGS. 10 and 11 illustrate the steps of a rod-in-tube technique used to produce the glass preform and the double-clad multi-component glass fiber 200 depicted in FIG. 8*a*. A glass ingot (not shown) formed from a first low-temperature multi-component glass (phosphate, germanate, borate or tellurite) possibly containing dopants (erbium and/or ytterbium) is formed in step 252. Once the ingot is formed, the ingot is cored to produce in step 254 a core glass rod 256. The barrel of the core glass rod 256 is polished in step 258. In step 260, an inner cladding glass tube 262 formed of a similar first multi-component glass but without dopants is drilled to have an inside diameter within 0.1 mm fluctuation of the outside diameter of the core glass rod. Both the inside and outside surfaces of the inner cladding glass tube are polished. In step 264, the core glass rod 256 is placed inside the inner cladding glass tube 262, and the assembly is drawn to form a glass rod 266 (step 265). The glass rod 266 is placed, in step 268, inside an outer cladding glass tube 270 formed of a second multi-component glass (possibly silicate or phosphate) and the preform 272 is drawn in step 273 into the double-clad multi-component glass fiber 200. Fiber drawings were performed in an argon gas atmosphere to reduce absorption of water from air exposure, which causes fluorescence quenching of $Er^{3+}$ ions. The fiber drawing was performed at 765° C. No plastic coating was applied to the fiber.

Only small modifications to this rod-in-tube process are required to draw fiber 208 and 30 shown in FIGS. 8b and FIG. 3, respectively. To draw fiber 208 shown in FIG. 8b, steps 260, 264 and 265 are skipped. The core glass rod 256 formed from the first multi-component glass is inserted directly into the outer cladding glass tube 270 and then drawn into the fiber. In this case, additional caution must be taken to prevent OH— diffusion from the cladding into the core. The second multi-component glass is carefully selected so that its refractive index is only slightly less than that of the first multi-component glass and its glass transition temperature and thermal expansion coefficient art within about 10% of those for the first multi-component glass. During perform fabrication and drawing, the OH— are removed using techniques well known in the glass manufacturing industry so that the OH— concentration is less than about 100 ppm. To draw fiber 30 shown in FIG. 3, the outer cladding is not required, thus steps 268 and 273 are skipped.

Figure 12:
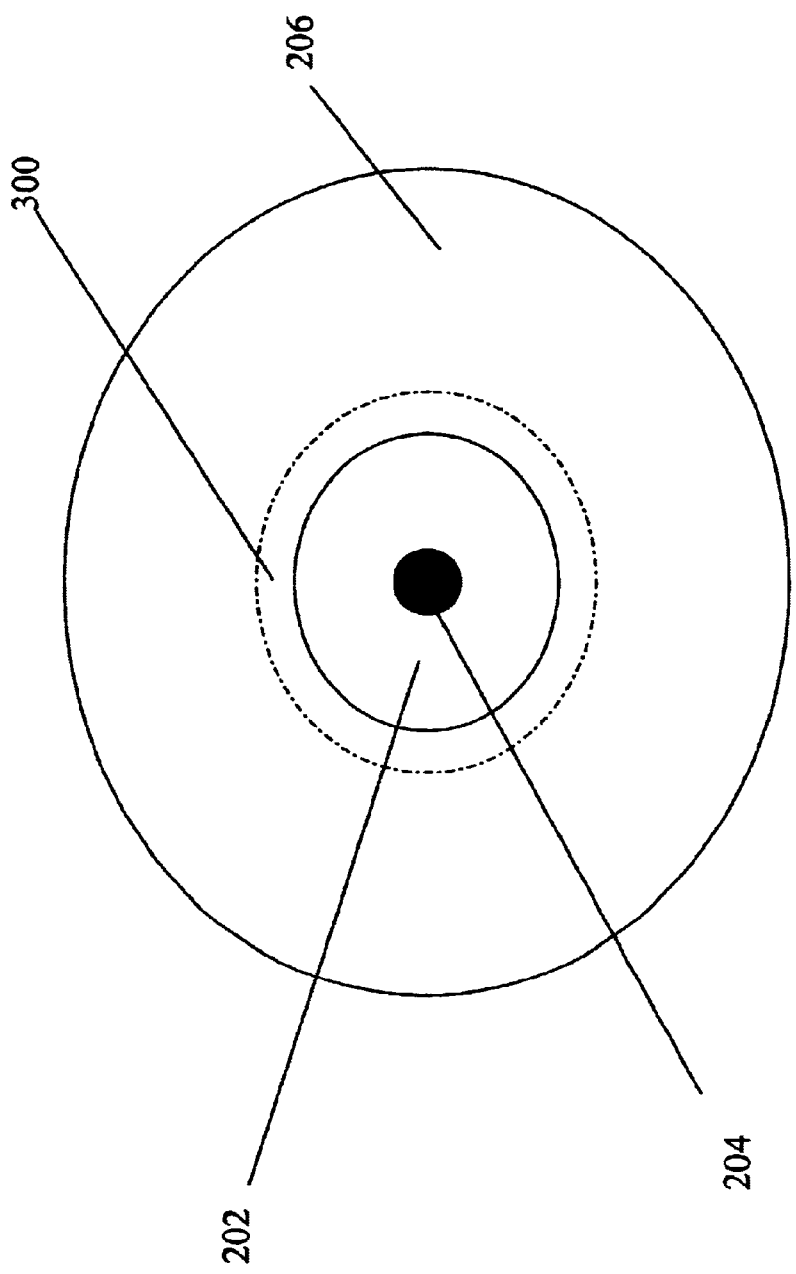
FIG. 12 is an exploded cross-sectional view of the interface between the phosphate inner cladding and the silicate outer cladding.

FIG. 12 is an enlarged view of the interface between the multi-component glass inner cladding 202 and the silicate outer cladding 206. Similar to what occurs when the multi-component glass fiber is fusion spiced to the silica fiber (shown in FIG. 7), a transition region 300 is formed around the inner cladding by the diffusion of modifier and intermediator ions from the inner cladding into the outer cladding. Although the multi-component glasses do not crystallize above a given temperature, the hybrid Si-x glass where x is a mixture of modifier and intermediator ions in the transition region 300 does exhibit a transition temperature $T_x$. Crystallization turns the glass opaque, which makes optical losses unacceptably high. Therefore $T_x$ establishes another upper bound on the drawing temperature $T_{draw}$. Thus, the heating and temperature profiles for fiber drawing are constrained as follows: $\max(T_{mc1-soft}, T_{mc2-soft}) < T_{draw} < T_x$ where $T_{mc1-soft}$ and $T_{mc2-soft}$ are the softening temperature of the two multi-component glasses.

While several illustrative embodiments of the invention have been shown and described, numerous variations and alternate embodiments will occur to those skilled in the art. For example, although the asymmetric fusion splice and outer cladding were developed to facilitate fusion splicing of low temperature multi-component glasses, both techniques may be applied to other glass compositions to either enable or strengthen the low loss fusion splice. Such variations and alternate embodiments are contemplated, and can be made without departing from the spirit and scope of the invention as defined in the appended claims.

We claim:

1. A method of fusing optical fiber, comprising:

Placing a first optical fiber formed of a silica glass and a second optical fiber formed of a first low-temperature multi-component glass in an end-to-end configuration with a small gap separating the fibers, said first multi-component glass having a softening point temperature that is lower than that of said silica glass;

Asymmetrically heating the fibers to raise the temperature of the first optical fiber ($T_{si}$) and the second optical fiber ($T_{mc}$) such that $T_{si} > T_{mc}$ at the gap between the fibers, $T_{mc} > T_{mc-soft}$ where $T_{mc-soft}$ is the softening temperature of the first multi-component glass, $T_{si} < T_{si-soft}$ where $T_{si-soft}$ is the softening temperature of the silica glass; and Moving the fibers together such that said fibers form thermal diffusion bonds between the first optical fiber and the second optical fiber.

2. The method of claim 1, wherein the step of asymmetrically heating the fibers includes:

Placing a heating element proximate the silica glass at a distance $d_o$ from the small gap away from the second optical fiber; and Activating the heating element to generate heat.

3. The method of claim 2, wherein the heating element comprises a pair of electrodes that are placed on either side of the first optical fiber to generate an arc that heats the first optical fiber.

4. The method of claim 2, wherein the heating element comprises a heating filament that lies at least partially around the first optical fiber.

5. The method of claim 2, wherein the heating element localizes the heat onto the first optical fiber, which in turn acts as a heating element to heat the second optical fiber.

6. The method of claim 2, wherein the bond between the fibers has a pull-strength in excess of 100 g.

7. A method of fusing optical fiber, comprising:

Placing a first optical fiber formed of a silica glass and a second optical fiber formed of a first low-temperature multi-component glass in an end-to-end configuration with a small gap separating the fibers, said first multi-component glass having a softening point temperature that is lower than that of said silica glass;

Placing a heating element proximate the silica glass at a distance $d_o$ from the small gap separating the fibers; and Activating the heating element to generate heat Thereby Asymmetrically hearing the fibers to raise the temperature of the first optical fiber ($T_{si}$) and the second optical fiber ($T_{mc}$) such that $T_{si} > T_{mc}$ at the gap between the fibers, $T_{mc} > T_{mc-soft}$ where $T_{mc-soft}$ is the softening temperature of the first multi-component glass, $T_{si} > T_{si-soft}$ where $T_{si-soft}$ is the softening temperature of the silica glass; and Moving the fibers together such that said fibers form thermal diffusion bonds between the first optical fiber and the second optical fiber, wherein the first low-temperature multi-component glass comprises a glass network former selected from one of (phosphorus oxide $P_2O_3$ or germanium oxide $GeO_2$ from 30 to 80 percent, a glass network modifier MO from 5 to 40 percent, and a glass netwrok intermediator $L_2O_3$ from 5 to 30 percent, wherein MO is selected from alkaline earth oxides and transition metal oxides consisting of BaO, BeO, MgO, SrO, CaO, ZnO, PbO and mixtures thereof, and $L_2O_3$ is selected from $Al_2O_3$, $B_2O_3$, $Y_2O_3$, $La_2O_3$, and mixtures thereof.

8. A method of fusing optical fiber, comprising:

Placing a first optical fiber formed of a silica glass and a second optical fiber formed of a low-temperature multi-component glass in an end-to-end configuration with a small gap separating the fibers, said first multi-component glass having a softening point temperature that is lower than that of said silica glass;

Placing a heating element proximate the silica glass at a distance $d_o$ from the small gap separting the fibers; and Activating the heat element to generate heat Thereby Asymmetrically heating the fibers to raise the temperature of the first optical fiber ($T_{si}$) and the second optical fiber ($T_{mc}$) such that $T_{si} > T_{mc}$ at the gap between the fibers, $T_{mc} > T_{mc\text{-}soft}$ where $T_{mc\text{-}soft}$ is the softening temperature of the first multi-component glass, $T_{si} > T_{si\text{-}soft}$ where $T_{si\text{-}soft}$ is the softening temperature of the silica glass; and Moving the fibers together such that said fibers form thermal diffusion bonds between the first optical fiber and the second optical fiber, wherein said second optical fiber is drawn with an outer cladding formed from a second multi-component glass having a softening temperature higher than the first multi-component glass and a glass network that is more compatible with forming strong thermal diffusion bonds with the silica glass.

9. The method of claim 8, wherein said second multi-component glass is a silicate glass that comprises a glass network of silicon oxide ($SiO_2$) from 30 to 80 percent, a glass network modifier MO from 5 to 40 percent, MO is selected from alkaline earth metal oxides consisting of BaO, BeO, MgO, SrO, CaO, ZnO, PbO and mixtures thereof, and $L_2O_3$ is selected from $Al_2O_3$, $B_2O_3$, $Y_2O_3$, $La_2O_3$, and mixtures thereof.

10. The method of claim 8, further comprising the step of first:

manufacturing a preform that includes the core and the inner cladding formed from the first multi-component glass and the outer cladding formed from the second multi-component glass; and drawing the preform to form the second optical fiber.

11. A method of fusing optical fibers, comprising:

Placing a first optical fiber formed of a silica glass and a second optical fiber in an end-to-end configuration with a small gap separating the fibers, said second optical fiber comprising a core formed from a first low-temperature multi-component glass and an outer cladding formed from a second multi-component glass, said second multi-component glass having a softening point temperature that is higher than that of said first multi-component glass yet compatible with drawing both glasses to form said second optical fiber, said second multi-component glass having a glass network that is more compatible than that of said first multi-component glass with forming strong thermal diffusion bonds with the silica glass;

Generating heat that causes said second optical fiber to soften while said first optical fiber does not soften; and Moving the fibers together such that said fibers form thermal diffusion bonds between the first optical fiber and the second optical fiber's outer cladding.

12. The method of claim 11, wherein said first multi-component glass is selected from one of phosphate or germanate and said second multi-component glass is silicate.

13. The method of claim 12, wherein said first multi component glass comprises a glass network former selected from one of (phosphorus oxide $P_2O_3$ or germanium oxide $GeO_2$) from 30 to 80 percent, a glass network modifier MO from 5 to 40 percent, and a glass network intermediator $L_2O_3$ from 5 to 30 percent, wherein MO is selected from alkaline earth oxides and transition metal oxides consisting of BaO, BeO, MgO, SrO, CaO, ZnO, PbO and mixtures thereof, and $L_2O_3$ is selected from $Al_2O_3$, $B_2O_3$, $Y_2O_3$, $La_2O_3$, and mixtures thereof.

14. The method of claim 13, wherein for the phosphorus oxide $P_2O_3$, glass network former the glass network modifier MO is from 5 to 30 percent.

15. The method of claim 13, wherein the second optical fiber's core is doped with 0.5 to 5 wt. % erbium and 0.5 to 30 wt. % ytterbium.

16. The method of claim 13, wherein said second multi component glass comprises a glass network of silicon oxide ($SiO_2$) from 30 to 80 percent, a glass network modifier MO from 5 to 40 percent, and a glass network intermediator $L_2O_3$ from 5 to 30 percent, MO is selected from alkaline earth oxides and transition metal oxides consisting of BaO, BeO, MgO, SrO, CaO, ZnO, PbO and mixtures thereof, and $L_2O_3$ is selected from $Al_2O_3$, $B_2O_3$, $Y_2O_3$, $La_2O_3$, and mixtures thereof.

17. The method of claim 12, wherein said silica fiber has a softening temperature greater than 1200° C., said first multi-component glass has a softening temperature less than 600° C. and said second multi-component glass has a softening temperature less than 800° C., said fibers being heated to a temperature between 800° C. and 1200° C.

18. The method of claim 11, wherein said first multi-component glass is phosphate and said second multi-component glass is tellurite.

19. The method of claim 18, wherein said first multi component glass comprises telluride oxide $TeO_2$ from 30 to 80 percent, a glass network modifier MO from 2 to 40 percent, and a glass network intertmediator XO from 2 to 30 percent, wherein MO is selected from alkaline earth oxides and transition metal oxides consisting of BaO, BeO, MgO, SrO, CaO, ZnO, PbO and mixtures thereof, and XO is selected from PbO, ZnO, $WO_3$, $Al_2O_3$, $B_2O_3$, $Y_2O_3$, $La_2O_3$, and mixtures thereof.

20. The method of claim 18, wherein said second multi component glass comprises a glass network of phosphorus oxide $P_2O_2$ from 30 to 80 percent, a glass network modifier MO from 5 to 40 percent, and a glass network intermediator $L_2O_3$ from 5 to 30 percent, MO is selected from alkaline earth oxides and transition metal oxides consisting of BaO, BeO, MgO, SrO, CaO, ZnO, PbO and mixtures thereof, and $L_2O_3$ is selected from $Al_2O_3$, $B_2O_3$, $Y_2O_3$, $La_2O_3$, and mixtures thereof.

21. The method of claim 18, wherein said silica fiber has a softening temperature greater than 1200° C., said tellurite glass has a softening temperature less than 400° C. and said phosphate glass has a softening temperature less than 600° C., said fibers being heated to a temperature between 600° C. and 1200° C.

22. The method of claim 11, wherein said second optical fiber further comprises an inner cladding around said core, said inner cladding being formed from said first multi-component glass.

23. The method of claim 22, wherein said cuter cladding has a refractive index that exceeds that of said inner cladding.

24. The method of claim 22, further comprising the step of first:
   manufacturing a preform that includes the core and the inner cladding formed from a first multi-component glass and the outer cladding formed from a second multi-component glass; and
   drawing the preform to form the second optical fiber.

25. The method of claim 24, wherein the preform is manufactured by:
   Forming a glass ingot from the first multi-component glass;
   Coring the glass ingot to produce a core glass rod;
   Inserting the core glass rod into an inner cladding glass tube also formed from the first multi-component glass to form an assembly;
   Drawing the assembly into a glass rod;
   Inserting the glass rod into an outer cladding glass tube formed from the second multi-component glass to form the preform; and
   Drawing the preform into the second optical fiber.

26. The method of claim 25, wherein the glass ingot is doped with rare-earth elements.

27. The method of claim 24, wherein the preform is manufactured by:
   Forming a glass ingot from the first multi-component glass;
   Coring the glass ingot to produce a core glass rod;
   Inserting the core glass rod into an inner cladding glass tube also formed from the first multi-component glass to form an assembly;
   Inserting the assembly into an outer cladding glass tube formed from the second multi-component glass to form the preform; and
   Drawing the preform into the second optical fiber.

28. The method of claim 11, wherein said outer cladding is formed on the surface of the core.

29. The method of claim 28, wherein said second multi-component glass is designed and manufactured to reduce the diffusion of OH— ions from the outer cladding into the core.

30. The method of claim 28, further comprising the step of first:
   Forming a glass ingot from the first multi component glass;
   Coring the glass ingot to produce a core glass rod;
   Inserting the core glass rod into an outer cladding glass tube formed from the second multi-component glass to form a preform; and
   Drawing the preform into the second optical fiber.

31. The method of claim 11, wherein the cross-sectional area of the outer cladding is at least 50% of the cross-sectional area of the second optical fiber.

32. The method of claim 31, wherein the optical properties of the second optical fiber are determined by the first multi-component glass and the mechanical properties are dominated by the thermal diffusion bonds between silica and the second multi-component glass.

33. The method of claim 11, wherein heating the fibers so that only the second optical fiber softens causes the second optical fiber's core to taper to a larger diameter at the bond between the two fibers.

34. The method of claim 33, wherein the taper approximately matches the mode fields in the fiber cores.

35. The method of claim 11, wherein a heating element is positioned proximate the first optical fiber a distance $d_o$ from the gap separating the fibers.

36. The method of claim 35, wherein said heating element asymmetrically heats said fibers to raise the temperature of the first optical fiber above the temperature of said second optical fiber thereby creating a temperature gradient at the gap between the two fibers with the temperature of said second optical fiber being above the softening temperature of both said first and second multi-component glasses.

37. The method of claim 36, wherein the second optical fiber has an end face that is exposed to the first optical fiber at the gap, the heating elements heating said first optical fiber thereby transferring heat down the first optical fiber to the gap to heat and soften the second optical fiber's end face.

38. A method of drawing a multi-component fiber that is compatible with fusion splicing to a silica fiber, comprising:
   manufacturing a preform that includes a core and an inner cladding formed from a first multi-component glass and an outer cladding formed from a second multi-component glass, said second multi-component glass having a softening point temperature that is higher than that of said first multi-component glass and having a glass network that is more compatible than that of said first multi-component glass with forming strong thermal diffusion bonds with silica glass; and
   drawing the preform to form the multi-component fiber.

39. The method of claim 38, wherein the preform is manufactured by:
   Forming a glass ingot from the first multi-component glass;
   Coring the glass ingot to produce a core glass rod;
   Inserting the core glass rod into an inner cladding glass tube also formed from the first multi-component glass to form an assembly;
   Drawing the assembly into a glass rod;
   Inserting the glass rod into an outer cladding glass tube formed from the second multi-component glass to form the preform; and
   Drawing the preform into the second optical fiber.

40. The method of claim 39, wherein the glass ingot is doped with rare-earth elements.

41. The method of claim 38, wherein the preform is manufactured by:
   Forming a glass ingot from the first multi-component glass;
   Coring the glass ingot to produce a core glass rod;
   Inserting the core glass rod into an inner cladding glass tube also formed from the first multi-component glass to form an assembly;
   Inserting the assembly into an outer cladding glass tube formed from the second multi-component glass to form the preform; and
   Drawing the preform into the second optical fiber.

42. A method of fusing optical fiber, comprising:
   Placing a first optical fiber formed of a silica glass and a second optical fiber formed of a first low-temperature multi-component glass in an end-to-end configuration with a small gap separating the fibers, said second optical fiber comprising a core formed from a first low-temperature multi-component glass and an outer cladding formed from a second multi-component glass, said second multi-component glass having a softening point temperature that is higher than that of said first multi-component glass yet compatible with drawing both glasses to form said second optical fiber, said second multi-component glass having a glass network that is more compatible than that of said first multi-component glass with forming strong thermal diffusion bonds with the silica glass;

Asymmetrically heating the fibers to raise the temperature of the first optical fiber ($T_{si}$) and the second optical fiber ($T_{mc}$) such that $T_{si}>T_{mc}$ at the gap between the fibers, $T_{mc}>T_{mc\text{-}soft}$ where $T_{mc\text{-}soft}$ is the softening temperature of the second multi-component glass, $T_{si}>T_{si\text{-}soft}$ where $T_{si\text{-}soft}$ is the softening temperature of the silica glass; and Moving the fibers together such that said fibers form thermal diffusion bonds between the first optical fiber and the second optical fiber.

43. The method of claim 42, wherein the step of asymmetrically heating the fibers includes:

Placing a heating element proximate the silica glass at a distance $d_o$ from the small gap separating the fibers; and Activating the heating element to generate heat.

44. The method of claim 43, wherein the heating element localizes the heat onto the first optical fiber, which in turn acts as a heating element to heat the second optical fiber.

45. The method of claim 43, wherein the bond between the fibers has a pull-strength in excess of 100 g.

46. The method of claim 42, wherein the first multi-component glass is phosphate or germanate and the second multi-component glass is silicate.

47. The method of claim 42, wherein the first multi-component glass is tellurite and the second multi-component glass is phosphate.

48. The method of claim 42, wherein the cross-sectional area of the outer cladding is at least 50% of the cross-sectional area of the second optical fiber so that the optical properties of the second optical fiber are determined by the first multi-component glass and the mechanical properties are dominated by the thermal diffusion bonds between silica and the second multi-component glass.

49. A method of fusing optical fiber, comprising:

Placing a first optical fiber formed of a silica glass and a second optical fiber formed of a first low-temperature multi-component glass in an end-to-end configuration with a small gap separating the fibers, said first multi-component glass having a softening point temperature that is lower than that of said silica glass;

Asymmetrically heating the fibers to raise the temperature of the first optical fiber ($T_{si}$) and the second optical fiber ($T_{mc}$) such that $T_{si}>T_{mc}$ at the gap between the fibers, $T_{mc}>T_{mc\text{-}soft}$ where $T_{mc\text{-}soft}$ is the softening temperature of the first multi-component glass, $T_{si}>T_{si\text{-}soft}$ where $T_{si\text{-}soft}$ is the softening temperature of the silica glass; and Moving the fibers together such that said fibers form thermal diffusion bonds between the first optical fiber and the second optical fiber, wherein the first low-temperature multi-component glass comprises a glass network former selected from one of (phosphorus oxide $P_2O_5$ or germanium oxide $GeO_2$) from 30 to 80 percent, a glass network modifier MO from 5 to 40 percent, and a glass network intermediator $L_2O_3$ from 5 to 30 percent, wherein MO is selected from alkaline earth oxides and transition metal oxides consisting of BaO, BeO, MgO, SrO, CaO, ZnO, PbO and mixtures thereof, and $L_2O_3$, is selected from $Al_2O_3$, $B_2O_3$, $Y_2O_3$, $La_2O_3$, and mixtures thereof.

50. A method of fusing optical fiber, comprising:

Placing a first optical fiber formed of a silica glass and a second optical fiber formed of a first low-temperature multi-component glass in an end-to-end configuration with a small gap separating the fibers, said first multi-component glass having a softening point temperature that is lower than that of said silica glass;

Placing a heating element proximate the silica glass at a distance $d_o$ from the small gap away from the second optical fiber; and Activating the heating element to locally heat the first optical fiber to raise its temperature ($T_{si}$) which in turn acts as a heating element to asymmetrically heat the second optical fiber to a temperature ($T_{mc}$) such that $T_{si}>T_{mc}$ at the gap between the fibers, $T_{mc}>T_{mc\text{-}soft}$ where $T_{mc\text{-}soft}$ is the softening temperature of the first multi-component glass, $T_{si}>T_{si\text{-}soft}$ where $T_{si\text{-}soft}$ is the softening temperature of the silica glass; and Moving the fibers together such that said fibers form thermal diffusion bonds between the first optical fiber and the second optical fiber.

* * * * *